(12) United States Patent
De Koning

(10) Patent No.: US 8,944,730 B2
(45) Date of Patent: Feb. 3, 2015

(54) ASSEMBLY AND METHOD FOR MACHINING OF AN OBJECT WITH A MILLING MACHINE

(75) Inventor: Abraham Gijsbert De Koning, Waarder (NL)

(73) Assignee: PEX Rent B.V., Waarder (NL)

(*) Notice: Subject to any disclaimer, the term of this patent is extended or adjusted under 35 U.S.C. 154(b) by 980 days.

(21) Appl. No.: 13/120,757

(22) PCT Filed: Sep. 30, 2009

(86) PCT No.: PCT/NL2009/050587
§ 371 (c)(1),
(2), (4) Date: Jun. 8, 2011

(87) PCT Pub. No.: WO2010/039032
PCT Pub. Date: Apr. 8, 2010

(65) Prior Publication Data
US 2011/0236146 A1    Sep. 29, 2011

(30) Foreign Application Priority Data

Sep. 30, 2008   (NL) ...................................... 2002040

(51) Int. Cl.
| | |
|---|---|
| *B23C 9/00* | (2006.01) |
| *B23C 1/00* | (2006.01) |
| *B23Q 7/04* | (2006.01) |
| *B23Q 7/14* | (2006.01) |
| *B23Q 41/02* | (2006.01) |
| *B23Q 7/16* | (2006.01) |

(52) U.S. Cl.
CPC ................ *B23Q 7/1431* (2013.01); *B23C 9/00* (2013.01); *B23Q 7/165* (2013.01); *B23C 1/00* (2013.01); *B23Q 2707/04* (2013.01); *B23Q 41/02* (2013.01); *B23Q 2230/006* (2013.01)
USPC ............ 409/131; 409/160; 409/225; 29/33 P; 198/346.1

(58) Field of Classification Search
CPC .................................................. B23Q 2230/006
USPC .................... 409/159–160, 219, 225; 483/14; 29/33 P, 563; 198/345.3, 346.1
See application file for complete search history.

(56) References Cited

U.S. PATENT DOCUMENTS 4,555,844 A * 12/1985 Palfery et al. .................... 483/14
5,655,423 A *  8/1997 Nishio et al. ..................... 82/1.11

(Continued)

FOREIGN PATENT DOCUMENTS

DE    3936385 A1 *  5/1991
EP    1270144 A       1/2003

(Continued)

OTHER PUBLICATIONS

International Search Report, dated Jan. 7, 2010, from corresponding PCT application.

*Primary Examiner* — Erica E Cadugan
(74) *Attorney, Agent, or Firm* — Young & Thompson

(57) ABSTRACT

Assembly and method for machining an object with a milling machine. The object needing machining on various sides so as to require clamping. It is proposed to mechanize this time-consuming operation. To this end a further clamp is attached to a conversion or turning station which may clamp the already partially machined object with an already partially machined side thereof. The mutual positioning of the clamp in which the object is located and the clamp wherein the object is transferred, is precisely defined and by the linear movement of the clamps in relation to each other, the object may be transferred. The additional clamp is configured to receive the object to be machined in precisely the desired position, without damage. Subsequently, a further clamp is again put into the milling machine with the aid of a robot so that other sides of the object can be further subjected to a milling operation.

7 Claims, 4 Drawing Sheets

(56) References Cited

U.S. PATENT DOCUMENTS 7,108,465 B2 * 9/2006 Kunii .............................. 29/33 P
2006/0075625 A1 * 4/2006 Schuster ......................... 29/563
2009/0116915 A1 * 5/2009 Kawasumi et al. ........... 408/146

FOREIGN PATENT DOCUMENTS

| JP | 2001-259955 A | * | 9/2001 |
| JP | 2002-263909 A | * | 9/2002 |

* cited by examiner

ASSEMBLY AND METHOD FOR MACHINING OF AN OBJECT WITH A MILLING MACHINE

The present invention relates to an assembly comprising a machining device, a clamp for an object to be machined, and a robot for moving clamps that embrace objects to and from the milling machine.

Such method is generally known in the art. Objects often have to be machined on a large number of different sides by means of a machining device such as a lathe, drilling machine or milling machine. It is not often possible to grip the object in a clamp in such a manner that all of these sides can be machined in different stages when in that position. Conversely, there is a precise relation between the machining of the various sides, so that great precision must be exercised when clamping the object in order that certain sides can still be accessed for milling.

For very large series of manufactured items, highly automated processes are used for transforming the objects into various positions. In the prior art, manual clamping is performed for small series (several to thousands), which is time-consuming and requires a high degree of skill on the part of the operator. Due to rising labour costs and the increasing difficulty to obtain personnel, an increasing number of problems arise in the performance of such an otherwise simple operation that needs to be carried out with great precision. Moreover, machining devices are becoming more and more expensive, so it is becoming increasingly important to keep these operating for as long as possible and preferably continuously.

It is the objective of the present invention to provide an assembly which enables the further automation of the machining process, in particular the milling of objects and more specifically to mechanize any clamping operation that may be required.

This objective is achieved with an assembly as described above, in that said assembly comprises a conversion station, said transfer station comprising a first carrier to take up a clamp and a second carrier to take up a clamp, said carriers being movable towards each other from opposing positions.

According to the present invention, a transfer station is applied. This transfer station is provided with a first carrier for taking up a first clamp by which the object that is clamped therein is subjected to a first series of machining and milling respectively. The transfer station is also provided with a second carrier for lifting up a second clamp. The second clamp is specifically embodied for receiving the object in a second position that deviates from the first position with which the object is attached in the first clamp. In this second position, it is possible to subject the other sides of the object to a machining operation. In the transfer station, the first and second clamps attached to the first and second carriers can be moved towards each other according to a precisely defined path so as to achieve the transfer movement of the object. In practice, the second clamp will be moved in an open position towards the partially machined object. After arriving at the correct position, the object then slides into the second clamp and limited clamping of the second object by means of the second clamp will take place. The object is then pressed firmly into the second clamp by the first clamp and full clamping of the object subsequently takes place. The first clamp then opens.

By precisely positioning the respective carriers in relation to each other, clamping may be left to be performed automatically while the position of the object is still precisely defined. Subsequently, the second clamp with the object may be placed in the milling machine. Because the position of the object in the second clamp is precisely known, the position of the object in relation to the milling machine is also known and further machining operations can be performed.

If so desired, automated correction of the position can take place.

The movement towards each other of the first and second carrier preferably takes place in a linear manner. Opening and closing of the clamp can be achieved in any conceivable manner. In an advantageous manner, the respective clamp can be coupled to the arm of a robot, if so desired, in conjunction with a pallet connected thereto. This coupling can provide control signals for opening and closing the clamp. Any other method of control is also conceivable.

Moreover, the transfer station described above may be provided with means for scanning. Indeed, it is not only possible to use the station for the transfer and/or clamping of the object, but it can also be used for the initial placement in the clamp of an object that has not yet been machined. In addition, it is important to be certain that the object is placed in the clamp in the proper manner by, for example, by a robot. The scanning means can be applied to ensure this.

According to a further particular embodiment of the invention, a discharge container for machined objects is provided. This discharge container is embodied in such a manner that a robot, with a second clamp coupled thereto, can be moved upwards. By opening the clamp, the object can be placed directly in the discharge container. This eliminates an additional operation that is known in the art and consists of gripping the machined object by means of a gripper mounted on the robotic arm and the placement thereof in the discharge container. Such an additional operation with the use of a gripper presents the risk of damage occurring to the newly machined object. However, because the second clamp is specifically embodied for receiving the respective object, there is no fear of such damage occurring.

According to a further advantageous embodiment, a receiving means is present into which objects to be machined are fed. Subsequently, a gripper is coupled to the robot which moves the objects to be machined, in the manner described above, towards the first clamp for the clamping thereof. In this case, any minor damage to the objects by the gripper is less relevant because a machining operation still needs to take place. However, it is also possible for the objects to be clamped in a first clamp beforehand and for the transfer station not to be used.

Preferably, a separate provision is present, such as a coupling, in order to couple the first clamp by means of a carrier or pallet connected therewith, directly with a robotic arm and to supply this to the milling machine. With this, the placement in the transfer station corresponds precisely to the placement in the direction of machining.

If a gripper is applied, this can be any gripper known in the prior art, such as a servo-controlled gripper, which can be used to accurately define both power and distance. Another possibility is the use of a, preferably, universal operating gripper and this can be provided with a predefined setting in order to provide a rough alignment with the desired size of the object. Furthermore, the gripper can have a relatively small opening and closing path for respectively gripping and releasing the objects.

Different grippers can be used for different functions. For example, a gripper can be used for holding the feed/discharge holder, a gripper for the workpiece and a gripper, for example, for tools. These grippers can be mounted to a common storage.

The invention also relates to a method for the milled machining of an object, comprising the provision of an object to be machined, the clamping thereof in a first clamp, the placement of the first clamp in a milling machine, the execution of a milling operation to a first side of the object, the reclamping of said object and the execution of a milling operation to a second side of said object and the removal of said machined object from the clamp, wherein said reclamping comprises the transfer of said object from a first clamp to a second clamp and the placement of the second clamp in the milling machine, wherein said transfer of said object from the first clamp to the second clamp comprises the provision of the first clamp to a first carrier, the provision of the second clamp to a second carrier, the displacement of said carriers towards each other and the transfer of said object from the first clamp to the second clamp.

It is also possible with the present invention to implement automation, even in relatively small series. In other words, a number of objects can be put ready in position and the various machining operations required can be performed without any further intervention by an operator. More over, it is possible to program the device so that, in the event of a malfunction, operations can continue on another group of objects, i.e. that they can be subjected to a machining operation. This means that, in the event of a malfunction, the milling machine does not automatically switch off, but switches over to some other activity. In this manner, it is possible to deploy milling machines and related systems fully automatically for prolonged periods, thus reducing the cost-price and number of operations required.

Additionally, after machining one side of said object on the milling machine, a side of a further object that deviates from said object is machined with said milling machine.

The invention will be now be clarified below with reference to an exemplary embodiment of a milling machine shown in the drawing, wherein.

Figure 1:
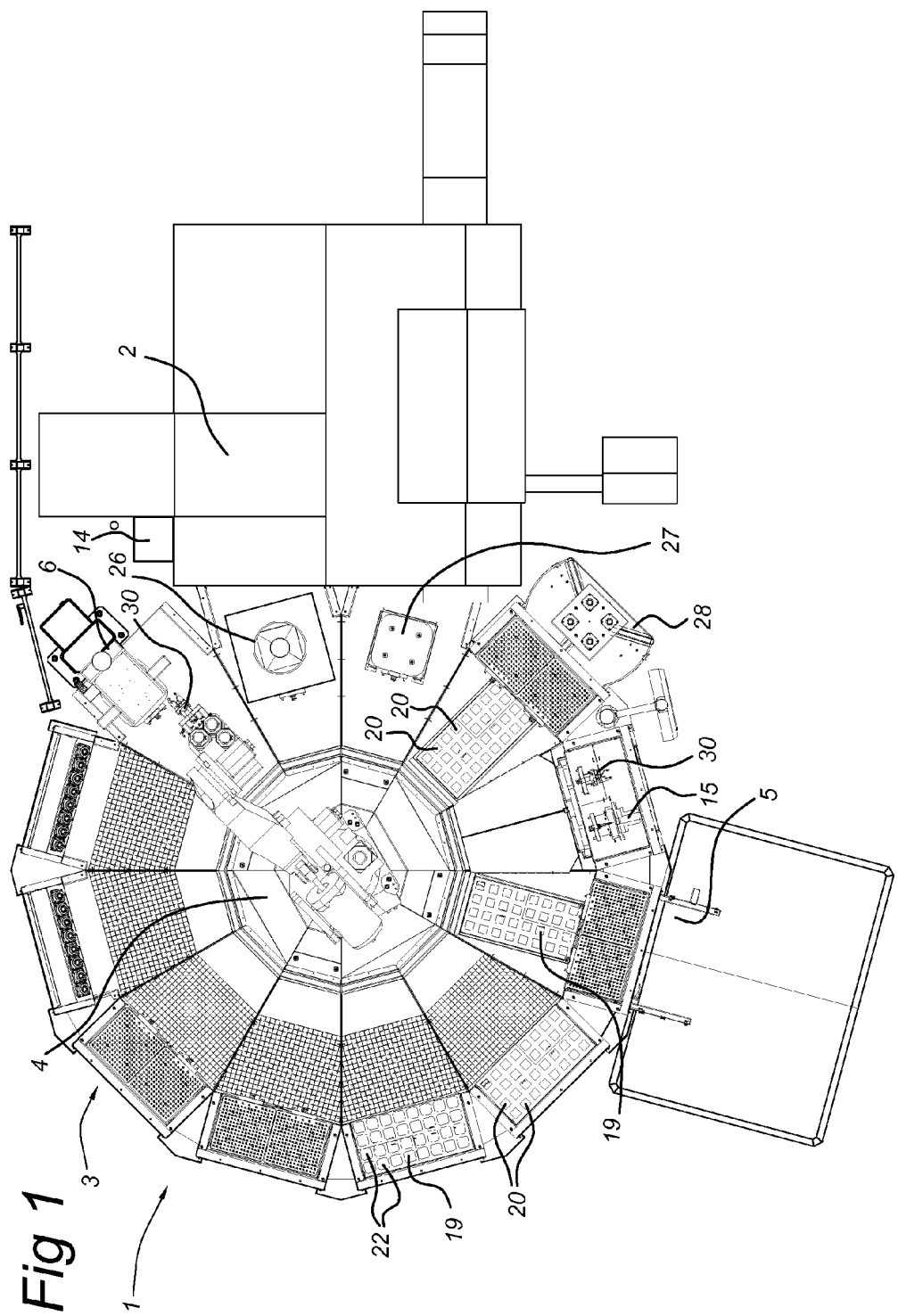
FIG. 1 shows the assembly according to the invention schematically and in top view.

The assembly according to the present invention is indicated in its entirety by the numeral 1 in FIG. 1. This consists of a milling machine 2 and a concatenated series of stations for feeding objects to the milling machine or removing them therefrom, and the execution of additional operations. Displacement of the objects towards the milling machine 2 is performed with a robot 4, provided with a control 14. Examples of various possible stations include a rinsing or blow-cleaning station 26 that can be used, for example, to remove turning chips and liquids directly after a milling operation is performed. In addition, a parking station 27 may be present for the temporary storage of objects.

Objects may be fed through a loading/unloading gate 5. In the objects shown, the objects to be machined 20 are fed through this gateway and received in a tray 19. It is also possible to clamp the objects beforehand in a clamp with pallet, through a gate 28, as will be discussed hereinafter.

The objects to be machined 20 need to be machined by a milling machine 2 in such a manner that reclamping is required. In other words, certain sides of the object 20 may not be accessible when simply clamped, which thus requires the displacement of the object into a different position.

Figure 2:
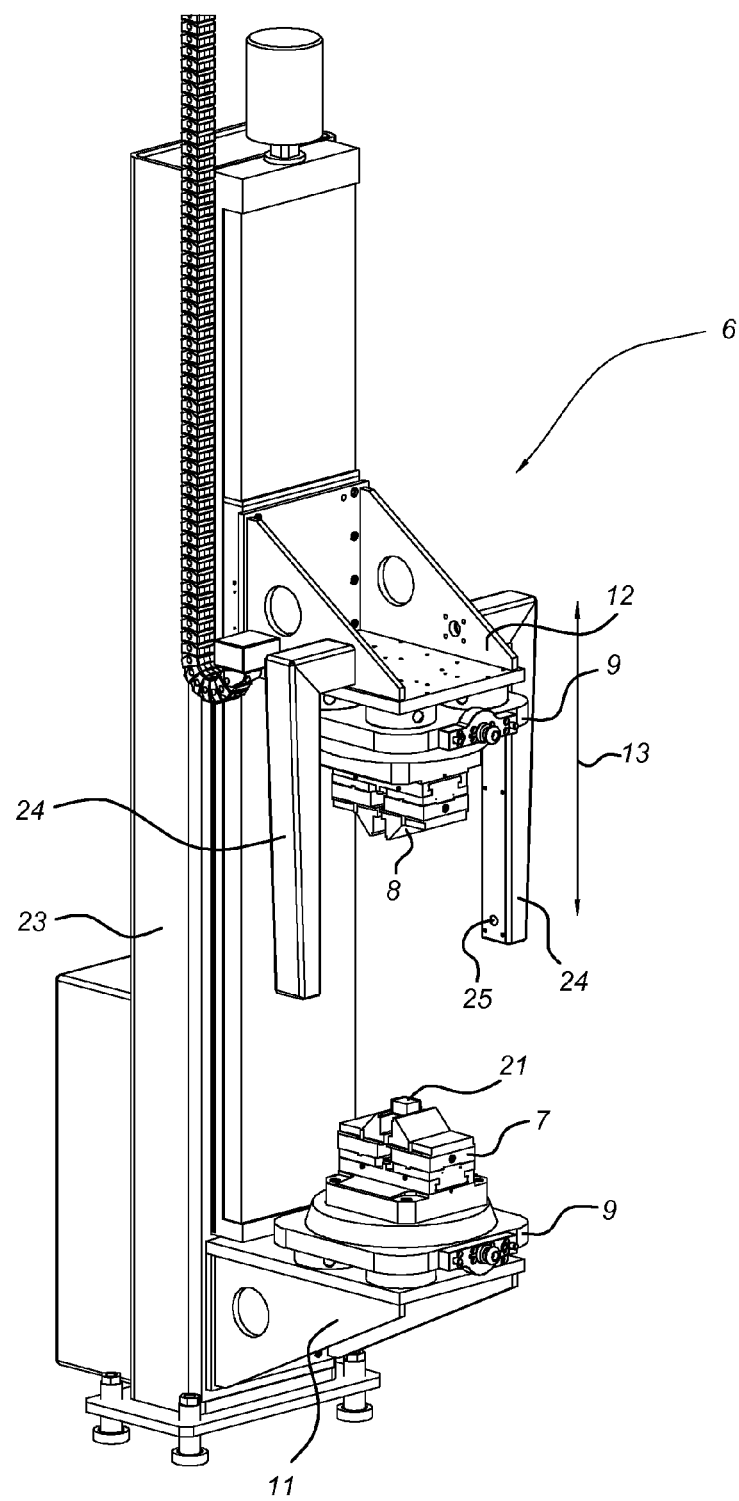
FIG. 2 shows the transfer or reversal station according to the invention in perspective view, with carriers moving away from each other.
Figure 3:
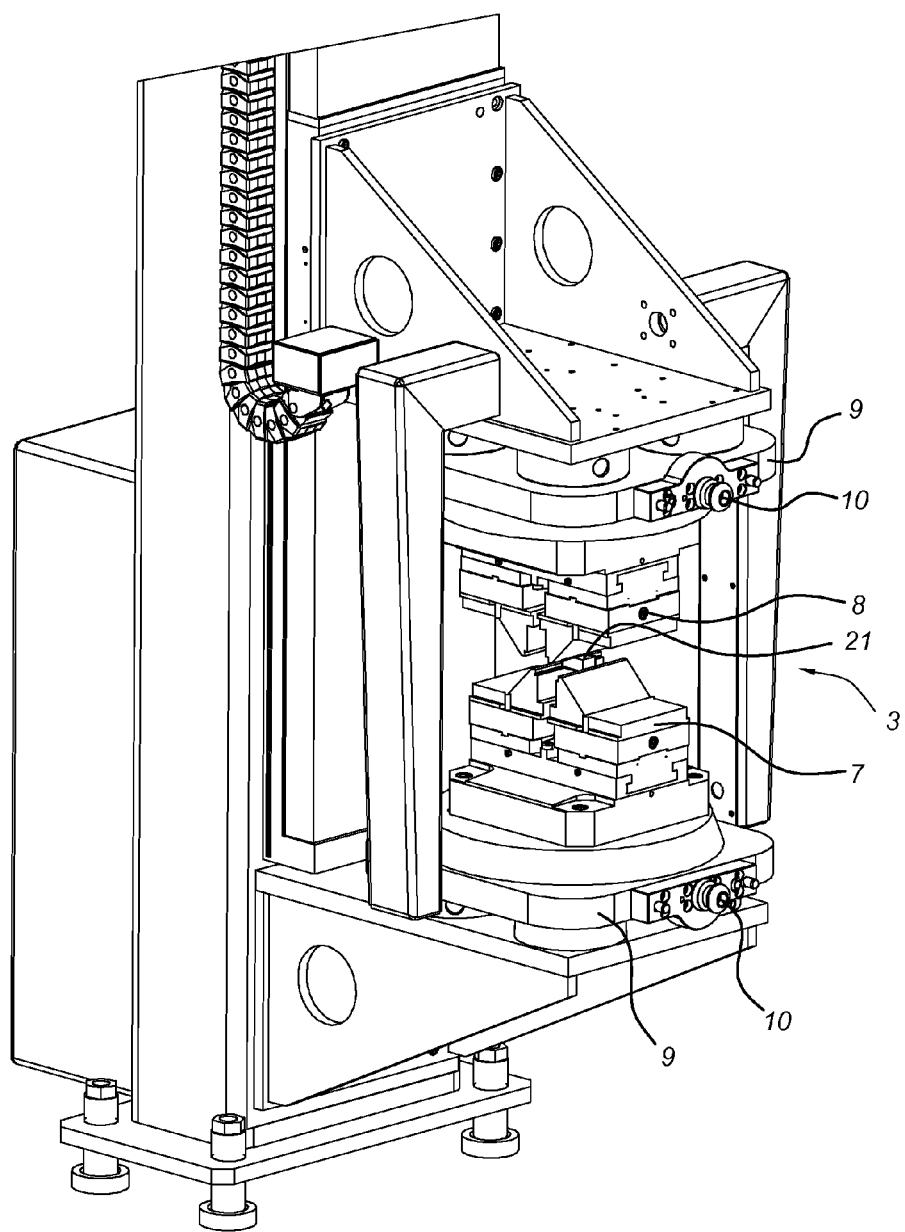
FIG. 3 shows the reversal station according to FIG. 2 with carriers moved towards each other.

According to the present invention a reversal or transfer station 6 is provided. Details thereof are shown in FIGS. 2 and 3. This station comprises a frame 23 provided with a first carrier 11 permanently connected thereto and a second linearly movable carrier 12 connected thereto. The second carrier 12 can be moved in the direction of the arrow 13 to and from the first carrier 11 respectively. Driving can be achieved. for example, with the use of a (servo) spindle mechanism. A controllable turntable can be present on carrier 11.

Both carriers 11 and 12 are embodied for receiving, for example, a first clamp 7 or a second clamp 8 attached to a pallet 9. A pallet 9 is used because this is provided with a special coupling 10 for coupling to the arm of robot 4. In addition to the provision of a coupling, a connection is also provided for the manipulation, via the robot, of the jaws [not shown] of the clamps 7 and 8, more specifically for the control thereof. The jaws of the clamps 7 and 8 are preferably product-specific and may be exchanged by the robot in the event that any other product needs to be machined. In addition to this, the same clamps 7 and 8 are used with changed jaws.

The moveable second carrier 12 is provided with one or more arms 24 at the end of which a laser 25 is located for sensing objects. With the movement of the laser 25 over the partially machined object 21, verification is performed to establish whether the object is placed in the exact position and is within the prescribed dimensions.

Figure 4:
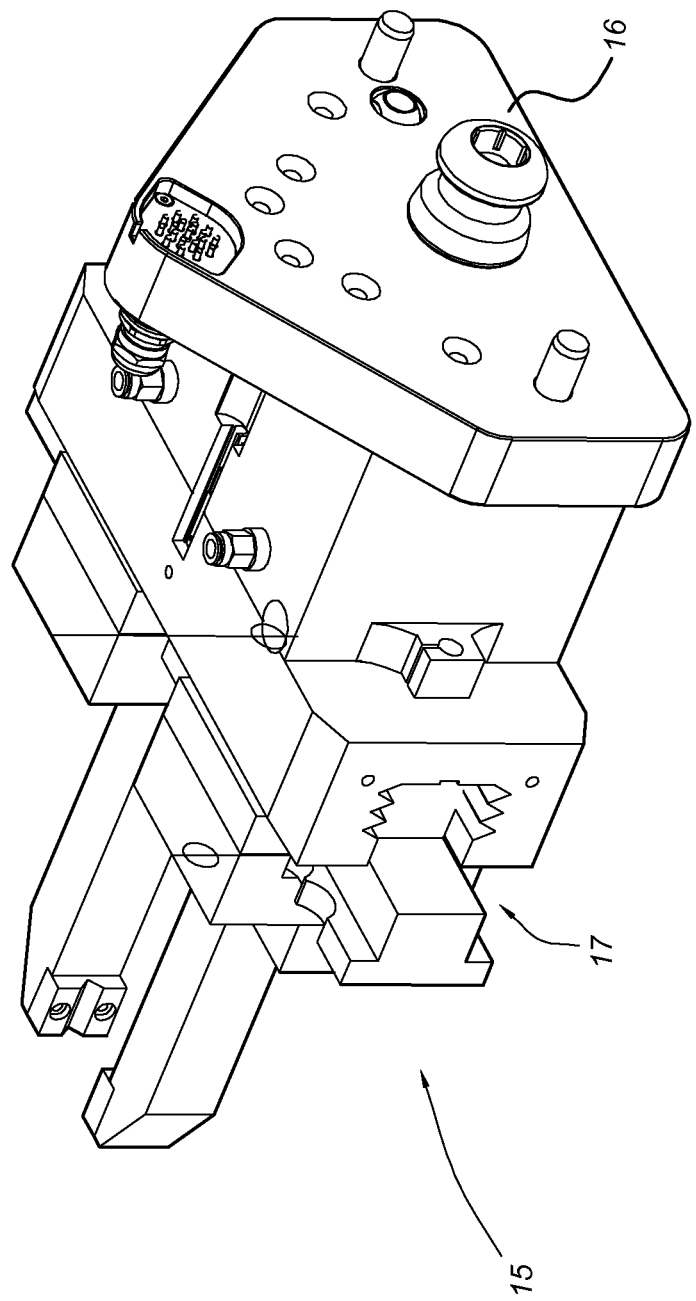
FIG. 4 shows an exemplary embodiment of a gripper used in the invention.

As shown in FIG. 4, a gripper 15 is provided for gripping objects. Other grippers can be present, for example, for the displacement of the trays or for the displacement of tools. The tool gripper is indicated in FIG. 1 by numeral 30. Each of the grippers is provided with a coupling means that resembles coupling 10 for connection with the robot 4, as described above. Furthermore, the gripper 15 for workpieces can be used across a wide operating range and this is why it is provided with a pre-setting means 17 so that the operating range for particular products can be relatively small. In this way, it is possible to grip certain objects very accurately across a wide operating range.

The above described device operates as follows:

Objects 20 to be machined are fed through loading gate 5, as indicated above. These are preferably arranged in a tray 19. At that moment, a tray gripper is coupled with the robot 4. The tray gripper is moved into the magazine and coupled with the robot by means of a product gripper 15 and this grips the object to be machined. That any damage (scratches and the like) occurs in this manner is irrelevant, since the respective object will be later subjected to a milling operation.

With the gripper, the object to be machined 20 is placed in the opened first clamp 7 on the transfer station. The object is firmly pushed into the desired position in clamp 7 by the robot. Clamp 7 then closes completely and the gripper is retracted.

Next, the second carrier 12 is moved downwards and verification is obtained with the laser 25 as to whether the object to be machined 20 is placed in the correct position and has the correct dimensions. If this is correct, after coupling with the robot arm 4, the first clamp 7, together with the corresponding pallet 9, is moved towards the milling machine 2 and is placed therein. This is where the first milling operation takes place. Subsequently, the partially machined object, which is indicated by the numeral 21, is again placed by the robot onto the first carrier 11, together with corresponding clamp 7 and platform 9. Meanwhile, a second clamp 8 with specific jaws is placed onto the second carrier 12. The receiving portion of the jaws is specially embodied to receive the portion of the machined object 21 protruding upwardly from the first clamp, without causing damage. These jaws of the second clamp 8 are in an opened position. The partially machined object is pushed firmly into place in clamp 7 by clamp 8.

Next, based on the position indicated in FIG. 2, the second carrier with the second clamp is moved towards the first carrier, as is shown in FIG. 3. The partially machined object 21 is transferred when the clamps 7 and 8 are positioned exactly above each other. This is done by first moving the object 21 between the partially closed jaws of clamp 7. Subsequently, the object is pressed tightly into the final position of the jaws 7. The clamp 7 then closes, after which clamp 8 is opened. Next, the second carrier is moved somewhat aside the first carrier.

Following this, the second clamp 8 with the corresponding platform 9 and coupling 10 can be taken over by the robot arm and placed again in the milling machine. The position of the partially machined object 21 is precisely known, i.e. the position in the milling machine has also been accurately defined. Accordingly, a further milling operation can take place immediately thereafter, which finally results in a machined object as indicated by 22. The second clamp 8, with the aid of the platform 9, is taken from the milling machine by the robot arm and placed into the desired position above the discharge container or the tray 19. As the jaws of the clamp 8 open, the machined object falls directly into the tray as is indicated in FIG. 1. Next, a filled tray or discharge container 19 moves to the position of the loading/unloading gate 5 and may be removed or moved to a place of storage.

After reading the above description, those skilled in the art will become readily aware of numerous alternative embodiments. Likewise, numerous stations can also be applied in order to perform additional operations. Such alternative embodiments lie within the scope of the appended claims.

The invention claimed is:

1. Method for the milled machining of an object, the method comprising
the provision of an object to be machined,
the clamping thereof in a first clamp,
the placement of the first clamp and the object in a milling machine,
the execution of a milling operation to a first side of said object while the first clamp is in the milling machine,
the removal of the first clamp and the object from the milling machine,
the reclamping of said object, said reclamping comprising:
the transfer of said object from the first clamp to a second clamp, wherein said transfer of said object from the first clamp to the second clamp comprises:
the provision of the first clamp to a first carrier;
the provision of the second clamp to a second carrier;
the displacement of the second carrier and second clamp towards the first carrier, the first clamp, and said object;
the handing off of said object from the first clamp to the second clamp;
wherein the method for the milled machining of the object further comprises:
the removal of the second clamp and the object from the second carrier;
the placement of the second clamp and the object in the milling machine;
the execution of a milling operation to a second side of said object held by the second clamp, which second side is opposite the first side; and
the removal of said machined object from the second clamp.

2. The method according to claim 1, wherein the displacement of the second carrier and the second clamp towards the first carrier and the first clamp comprises a vertical linear movement.

3. The method according to claim 1, wherein said object machined on the second side is moved with the second clamp above a removal container and falls into the removal container by means of releasing the clamping action of the second clamp.

4. The method according to claim 1, wherein a side of a further object is machined with said milling machine.

5. The method according to claim 1, wherein the provision of said object to be machined comprises:
the gripping and picking up of said object to be machined from of a supply container by means of a mechanical gripper; and
the placement of said object in the first clamp.

6. Method according to claim 1, wherein the steps of the placement of the first clamp and the object in the milling machine, the provision of the first clamp to the first carrier, the provision of the second clamp to the second carrier, the removal of the second clamp and the object from the second carrier, and the placement of the second clamp and the object in the milling machine, are performed by a robot.

7. Method according to claim 1, wherein the first and second carrier are provided in a transfer station and the steps of reclamping of the object and transfer of the object are performed in the transfer station.

* * * * *